United States Patent [19]

Takahashi

[11] Patent Number: 4,787,009
[45] Date of Patent: Nov. 22, 1988

[54] OPTICAL DISK

[75] Inventor: Kenji Takahashi, Miyagi, Japan

[73] Assignee: Sony Corporation, Tokyo, Japan

[21] Appl. No.: 53,402

[22] Filed: May 22, 1987

[30] Foreign Application Priority Data

Jun. 26, 1986 [JP] Japan ............................. 61-98000[U]

[51] Int. Cl.⁴ ...................... G11B 23/00; G11B 5/82; G11B 7/00
[52] U.S. Cl. ................................. 369/282; 369/284; 369/290
[58] Field of Search ............... 369/280, 282, 283, 284, 369/286, 289, 270, 271; 360/135

[56] References Cited

U.S. PATENT DOCUMENTS

| 4,503,474 | 3/1985 | Nigam . | |
|---|---|---|---|
| 4,564,932 | 1/1986 | Langé | 369/286 |
| 4,616,278 | 10/1986 | Yamaguchi et al. | 369/282 |
| 4,644,520 | 2/1987 | Langé | 369/286 |
| 4,658,393 | 4/1987 | Ohta et al. | 369/286 |

FOREIGN PATENT DOCUMENTS

| 0137965 | 4/1985 | European Pat. Off. . |
|---|---|---|
| 0174651 | 3/1986 | European Pat. Off. . |
| 8311023 | 7/1983 | France . |
| 62-192946 | 8/1987 | Japan . |

Primary Examiner—Steven L. Stephan
Attorney, Agent, or Firm—Philip M. Shaw, Jr.

[57] ABSTRACT

An optical recording and/or reproducing disk includes a disk substrate and a chucking hub, in which the chucking hub is formed of a synthetic resin ring having formed on its lower surface a welding portion and on its upper surface a ultrasonic welding horn contact portion and a disk-shaped metal plate made of a magnetic material and forming near its outer peripheral portion a low stepped portion, the synthetic resin ring being integrally formed on the low stepped portion by a resin molding and the chucking hub being fixed to the central portion of the disk substrate by welding a welding portion of an resin ring by using the ultrasonic welding horn.

5 Claims, 4 Drawing Sheets

OPTICAL DISK

BACKGROUND OF THE INVENTION

1. Field of the Invention

The present invention relates generally to disks such as an optical recording disk, an optical reproducing disk or the like and, more particularly to a disk having a magnet chucking hub fixed thereto by means of a ultrasonic welding.

2. Description of the Prior Art

A known optical recording or reproducing disk is generally incorporated in a disk cartridge in which a part of the surface of the disk and a chucking hub fixed to the center of the disk are exposed through an opening formed through the disk cartridge. Upon non-use, a shutter closes the opening of the disk cartridge to hide the optical disk.

Upon use of this disk, when the disk cartridge is loaded on a recording and reproducing apparatus, the shutter is opened and a disk table is inserted into the central portion of the opening of the disk cartirdge, so that the disk is held on the disk table by the chucking hub so as to become rotatable. Under this state, the disk is rotated as the disk table is rotated and a head assembly is moved so as to correspond to the opening of the disk cartridge to thereby carry out the recording or reproduction.

In the prior art, a magnet chucking system is employed in order to hold the optical disk on the disk table positively and easily. A known chucking hub is made of a metal plate to prevent the magnet chucking hub and its central opening from being abraded away.

Referring to FIG. 1, a chucking hub 2 made of a metal plate (which may be made of a magnetic metal plate or sheet) is fixed to both surfaces of, for example, an optical disk 1 at its central portion. The optical disk 1 is held on a disk table 3 of a recording and reproducing apparatus and a top portion of a disk table shaft 4 is inserted into a central opening 2a of the chucking hub 2, whereby the chucking hub 2 is attracted by an attraction force of a magnet 5 fixed to the inside of the disk table 3, thus the disk 1 being rotated together with the disk table 3.

As FIGS. 1 and 2 illustrate, the chucking hub 2 is formed of a disk-shaped metal plate 6 and a resin layer 7 bonded to the outer peripheral portion of the metal plate 6. The chucking hub 2 is fixed to the disk 1 by welding the resin layer 7 to the disk 1 coated with a resinous material by means of a ultrasonic welding horn 8.

In the thus constructed optical disk 1, the chucking hub 2 is so formed as to allow the resin layer 7 to cover the outer peripheral portion of the disk-shaped metal plate 6 from its peripheral end edge portion of the rear surface. Accordingly, the resin layer 7 is molded on the disk-shaped metal plate 6 by a molding process. Therefore, the chucking hub 2 can not be mass-produced, but must be manufactured one by one, so that its cost is increased. Further, the resin layer 7 is flush with the surface of the disk-shaped metal plate 6, so that in the welding process, the ultrasonic welding horn 8 directly contacts with the surface of the chucking hub 2, or the surface of the disk-shaped metal plate 6. Thus, the ultrasonic welding horn 8 is abraded away considerably. Also, in the welding process, the vibration of this metal plate 6 and the ultrasonic welding horn 8 causes abnormal sound to emanate.

Furthermore, the resin layer 7 is bonded to the disk-shaped metal plate 6 only on its rear surface, outer peripheral end edge surface and the inner peripheral surface of an opening 6a bored through the metal plate 6, i.e. only on the resin layer 7 which is opposed to the chucking surface of the chucking hub 2 and its thickest portion. Thus, resin layer 7 is bonded to the metal plate 6 with a poor bonding strength and the disk-shaped metal plate 6 will peel or detach from the resin layer 7, or the chucking hub 2 will be broken when the optical disk 1 frequently loaded onto or unloaded from the disk table 3.

OBJECTS AND SUMMARY OF THE INVENTION

Accordingly, it is an object of this invention to provide an improved disk.

It is another object of this invention to provide an optical disk in which a chucking hub can be positively fixed to a disk by means of a ultrasonic welding horn.

It is a further object of this invention to provide an optical disk the productivity of which is considerably improved and which can be produced at low cost.

According to one aspect of the present invention, there is provided an optical disk comprising:

(a) a disk substrate having an optical recording medium on or from which information is recorded or reproduced optically; and (b) a chucking hub formed of a disk-shaped metal plate made of a magnetic material which is formed on a position near its outer peripheral portion with a low stepped portion through which a plurality of openings are bored, and a synthetic resin ring attached through the openings to the outer peripheral portion of said metal plate and having formed on its upper surface a contacting portion which contacts with a ultrasonic welding horn and having formed on its lower surface a welding portion, wherein said chucking hub is fixed to a central portion of said disk substrate by welding the welding portion of said synthetic resin ring to the surface of said disk substrate by said ultrasonic welding horn.

These and other objects, features and advantages of the present invention will become apparent from the following detailed description of the preferred embodiment that is to be read in conjunction with the accompanying drawings, in which like reference numerals identify like elements and parts.

DESCRIPTION OF THE PREFERRED EMBODIMENT

Now, an embodiment of a disk, for example, an optical disk according to the present invention will hereinafter be described with reference to FIGS. 3 to 6.

Figure 1:
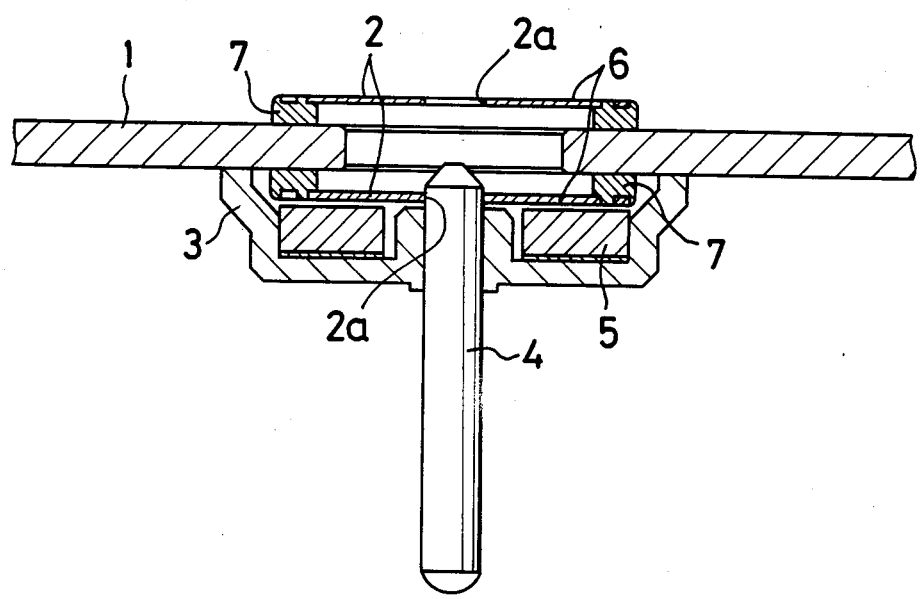
FIG. 1 is a cross-sectional view illustrating a known optical disk held on a disk table through a chucking hub.
Figure 2:
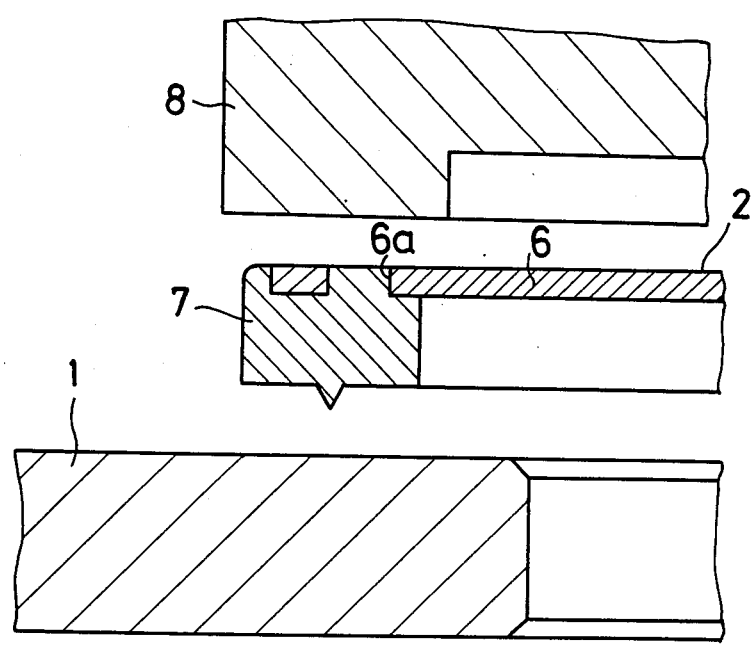
FIG. 2 is a partly enlarged cross-sectional view illustrating the chucking hub welded to the known disk by a ultrasonic welding horn.
Figure 3:
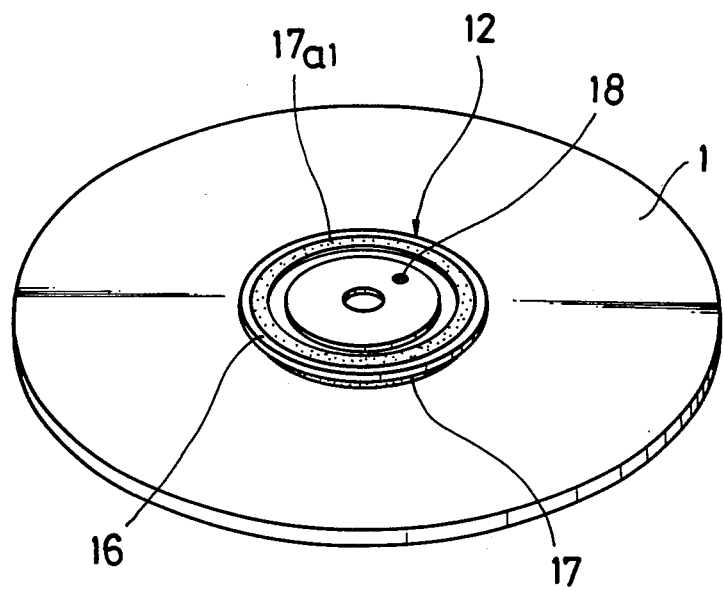
FIG. 3 is a perspective view illustrating an embodiment of a disk according to the present invention.
Figure 4:
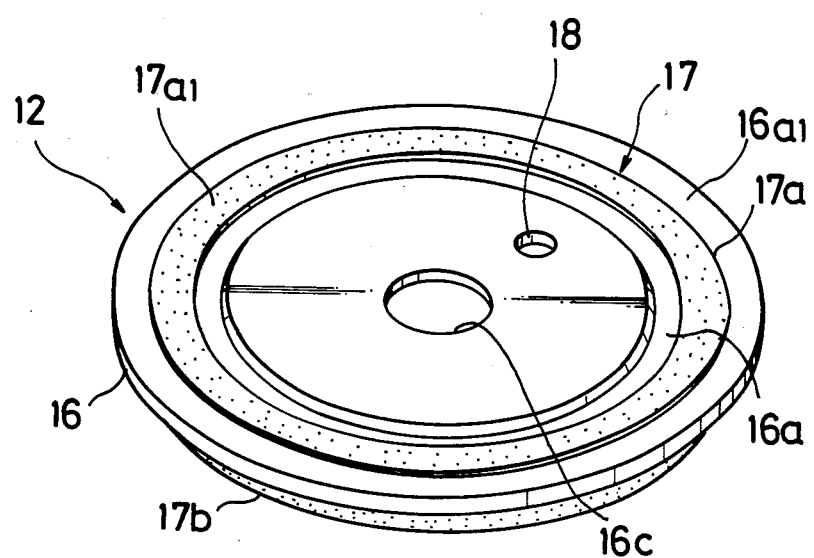
FIG. 4 is a perspective view of an example of a chucking hub used in the disk shown in FIG. 3.
Figure 5:
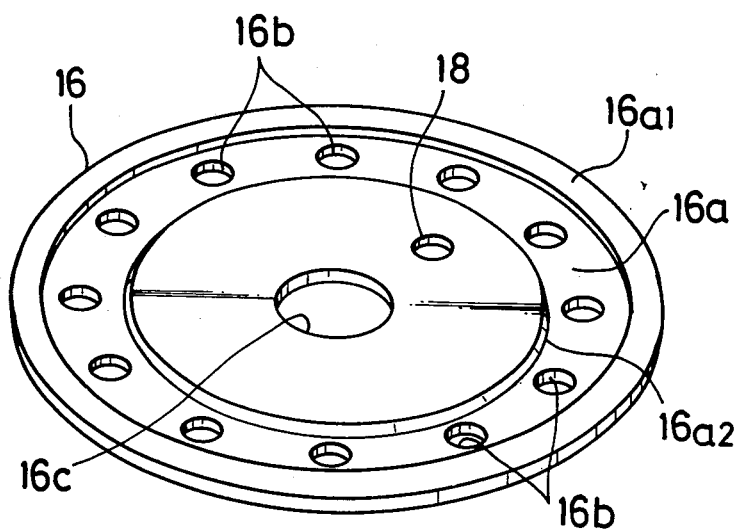
FIG. 5 is a perspective view of an example of a disk-shaped metal plate which forms a part of the chucking hub shown in FIG. 4.
Figure 6:
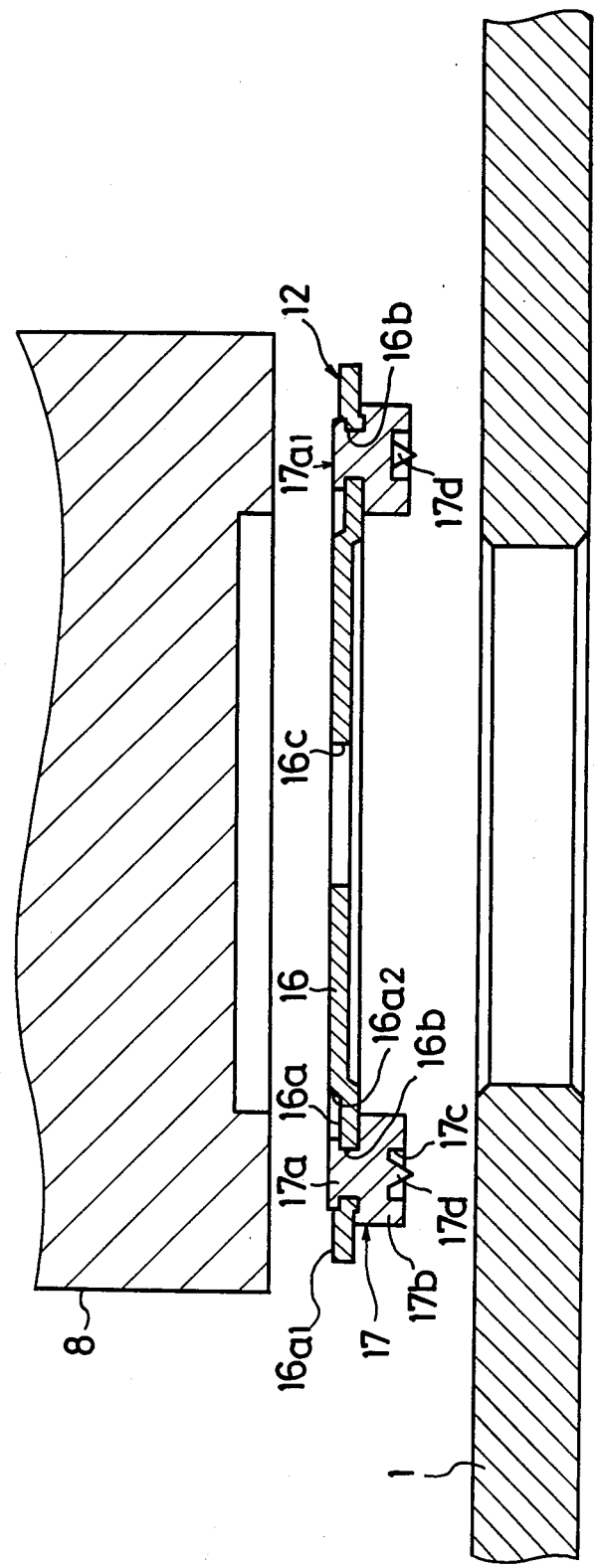
FIG. 6 is an enlarged cross-sectional view used to explain a state that the chucking hub is welded to the disk of the invention.

Referring to FIGS. 3 to 5, a disk-shaped metal plate 16 which is a main body of a chucking hub 12 of this embodiment is made of a magnetic metal. As shown in FIGS. 5 and 6, the disk-shaped metal plate 16 has formed around its outer peripheral portion a ring-shaped low stepped portion 16a. This low stepped portion 16a is made to have a step of a predetermined height, for example, a step of a height substantially one-half the thickness of the disk-shaped metal plate 16. Around the outer peripheral end edge portion of the low stepped portion 16a is formed a ring-shaped stepped surface portion $16_{a1}$ of which the height is slightly higher than that of the low stepped portion 16a. As illustrated in FIG. 5, a plurality of openings 16b are bored through the low stepped portion 16a along its circumferential direction so as to be spaced apart from one another with a predetermined distance. A central opening 16c is bored through the metal plate 16 at its center. Further, a positioning aperture 18 is bored through the metal plate 16 to determine the position of the gate when the disk-shaped metal plate 16 is placed within a metal mold upon manufacturing. Of course, the position of the gate may be determinable by other proper means instead of the positioning aperture 18.

A ring made of synthetic resin (hereinafter simply referred to as a resin ring) 17 is integrally fixed through the openings 16b to the metal plate 16 on both surfaces of its outer peripheral portion. As shown in FIG. 6, the resin ring 7 is vertically molded through the openings 16b to the upper and lower surfaces of the ring-shaped low stepped portion 16a of the disk-shaped metal plate 16 at the position inside the outer peripheral ledge portion of the stepped portion 16a according to what may be called the outsert molding method. An upper ring portion 17a of the resin ring 17, which has a thickness substantially equal to the stepped amount of the low stepped portion 16a, is extended along the inner peripheral edge portion of the stepped surface portion $16_{a1}$ and spaced apart from an inner peripheral edge portion $16_{a2}$ of the low stepped portion 16a by a predetermined distance. Whereas, a lower ring portion 17b of the resin ring 17 is molded thicker and wider than the upper ring portion 17a. On the lower surface of the lower ring portion 17b is formed a concave groove 17c extended along the whole periphery of the lower ring portion 17b. A plurality of circumferentially arranged welding protrusions project from the bottom surface of the concave groove 17c downward so as to exceed the lower surface of the lower ring portion 17b.

Since the chucking hub 12 is formed of the disk-shaped metal plate 16 and the resin ring 17, which is fixed to the metal plate in such a way that its outermost peripheral edge portion is exposed, the chucking hub 12 can be sequentially manufactured by the use of a hoop of magnetic metal material. More specifically, a punching machine can form continuously fed hoop material, into the disk-shaped metal plate 16, its low stepped portion 16a, the stepped surface portion $16_{a1}$ slightly higher than the low stepped portion 16a on the low stepped portion 16a at its outer peripheral edge portion, the plurality of openings 16b and the central opening 16c. Then, the resin ring 17 is formed on the low stepped portion 16a of the metal plate 16 by an outsert mpolding process as to combine the upper and lower portions 17a and 17b through the openings 16b. Finally, the outermost peripheral edge of the disk-shaped metal plate 16 is removed by punching and cutting it off from the hoop material, thus providing a chucking hub 12 having a resin ring 17 fixed thereto.

The thus constructed chucking hub 12 is fixed to the disk 1 by the ultrasonic welding horn 8 using the same method as that of the prior art. According to the embodiment of the present invention, the upper ring portion 17a of the resin ring 17 fixed to the chucking hub 12, or its contact surface $17_{a1}$ by means of ultrasonic welding horn 8 is located on the low stepped portion 16a of the disk-shaped metal plate 16. At the same time, the upper ring portion 17a is spaced apart from the inner peripheral edge portion $16_{a2}$ of the low stepped portion 16a, so that even when the ultrasonic welding horn 8 contacts with the contact surface $17_{a1}$, which is the upper ring portion 17a, the ultrasonic welding horn 8 is prevented from contacting with the exposed surface of the metal plate 16 of the chucking hub 12. Accordingly, the ultrasonic welding horn 8 is prevented from being abraded away and no abnormal sound emanates since the ultrasonic welding horn 8 does not contact the metal plate 16. Further, the protrusions 17d projecting downward beyond the lower surface of the lower ring portion 17b can be melted and welded positively to the disk 1. In this case, the protrusions 17d are melted within the concave groove 17c of the lower ring portion 17b, so that the extra melted resin of the protrusions 17d is prevented from protruding to the outside through the space between the lower ring portion 17b and the disk 1. At the same time, the space of the concave groove 17c can absorb the heat generated when the protrusions 17d are melted, so that any bad influence caused by the resulting heat is not exerted upon the disk 1.

The chucking hub 12 thus fixed to the disk 1 is magnetically held on the disk table by the use of the magnet in the same way as described above. In accordance with this embodiment of the invention, the resin ring 17 is positively engaged at its upper ring portion 17a with the disk-shaped metal plate 16, so that although the disk 1 is repeatedly held on the disk table, the disk-shaped metal plate 16 of the chucking hub 12 is prevented from being detached from the resin ring 17. Further, since the resin ring 17 is fixed to the disk-shaped metal plate 16 near its outer periphery, the area in which the metal plate 16 is attracted by the magnet in the disk table of the recording and reproducing apparatus can be increased. Therefore, the attraction force of the magnet located in the inside of the disk table is not decreased. Hence, the chucking hub 12 can be positively held on the disk table by the magnet and the normal rotational force is transmitted to the disk 1.

Since the chucking hub 12 with the resin ring 17 fixed thereto is manufactured by continuously feeding the hoop material, which is the material for the disk-shaped metal plate 16, the productivity of the invention is greatly improved as compared with that of the known system where the disk is manufactured one by one as finished goods. Hence, the cost of the disk can be reduced.

While the portion of the resin ring 17 where it contacts with the welding horn 8, that is, its portion $17_{a1}$ exposed to the upper surface side of the disk-shaped metal plate 16 is formed as an annular-shaped portion as described above, this contact portion $17_{a1}$ can be divided and formed at a plurality of places. This contact portion 17*a*1 can further be divided and formed at every opening 16*b* of the disk-shaped metal plate 16. Further, the melting protrusions 17*d* are not always formed within the concave groove 17*c* of the resin ring 17 but can be directly protrude from the resin ring 17 at its lower surface which is formed as a flat surface.

Furthermore, the shape of the chucking hub 12 itself, the stepped amount and width of the low stepped portion 16*a* of the disk-shaped metal plate 16, etc. can be freely varied as required.

According to the present invention, as described above, the low stepped portion is formed near the outer peripheral portion of the disk-shaped metal plate which is the main body of the magnet chucking hub for the recording or reproducing disk. At the same time, the welding horn contact portion formed together with the synthetic resin ring to be welded by the ultrasonic welding horn is exposed to the upper surface of the low stepped portion. Consequently, when the chucking hub is welded to the disk, the ultrasonic welding horn can be prevented from contacting with the metal plate, so that the worn ultrasonic welding horn can be prevented from being abraded and the abnormal sound is prevented from emanating. Further, the chucking hub can be welded to the disk smoothly and positively. In addition, the bonding strength between the disk-shaped metal plate and the synthetic resin ring is increased, so that although the disk or its chucking hub is held repeatedly, the chucking hub is prevented from being detached from the resin ring and the chucking hub can be prevented from being broken. Thus, the disk of the invention has a long life span.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

I claim as my invention:

1. An optical disk of the type having an optical recording medium disk substrate on or from which information signals are recorded or reproduced optically and a chucking hub, which is welded by means of an ultrasonic welding horn to the disk substrate, and wherein the chucking hub comprises:
   (a) a disk-shaped metal plate having an upper surface and a lower surface and being made of a magnetic material which, at its periphery, is bent to have a low stepped portion in its upper surface through which a plurality of openings extend, the low stepped portion having an inner diameter which is less than the inner diameter of the ultrasonic welding horn used to weld the hub to the disk substrate, and
   (b) a synthetic resin ring attached through the plurality of openings to the periphery of the metal plate, the resin ring having
      (i) an upper surface on which is formed a contacting portion, for contact with the ultrasonic welding horn, the contacting portion being formed so as to be spaced apart from the bend which forms the low stepped portion of the metal plate and being substantially flush with the upper surface of the metal plate, and
      (ii) a lower surface, which protrudes from the bottom surface of the low stepped portion, on which is formed a welding portion which is ultrasonically welded to a central portion of the surface of the disk substrate.

2. An optical disk according to claim 1, wherein said synthetic resin ring is integrally formed with said disk-shaped metal plate by the resin molding.

3. An optical disk according to claim 2, wherein said welding portion is formed of a concave groove and further including a plurality of welding protrusions which project out of the concave groove.

4. An optical disk according to claim 3, wherein said welding protrusions are formed at a plurality of places in the circumferential direction of said concave groove so as to be spaced apart from one another by a predetermined distance.

5. A method of manufacturing an optical disk of the type having an optical recording medium disk substrate on or from which information signals are recorded or reproduced optically and a chucking hub, which is welded by means of an ultrasonic welding horn to the disk substrate, and comprising the steps of:
   (a) punching out from continuously fed hoops of magnetic material a disk-shaped metal plate having an upper surface and a lower surface;
   (b) bending the plate at its periphery to have a low stepped portion in its upper surface, the low stepped portion having an inner diameter which is less than the inner diameter of the ultrasonic welding horn used to weld the hub to the disk substrate,
   (c) forming a plurality of openings through the stepped portion;
   (c) molding a synthetic resin ring to extend through the plurality of openings in the periphery of the metal plate, the molding step further including the steps of
      (i) forming on the upper surface of the resin ring a contact surface for contacting with the ultrasonic welding horn, the contact surface being formed so as to be spaced apart from the bend which forms the low stepped portion of the metal plate and being substantially flush with the upper surface of the metal plate, and
      (ii) forming protrusions from the bottom surface of the resin ring, and;
   (d) contacting the ultrasonic welding horn with the contact surface of the resin ring to weld the protrusions to a central portion of the surface of the disk substrate.

\* \* \* \* \*